(12) United States Patent
Masuko

(10) Patent No.: US 8,984,391 B2
(45) Date of Patent: Mar. 17, 2015

(54) WEB PAGE OBJECT PLACEMENT WITH CHANGING OBJECT SIZE RESPONSIVE TO THE ATTRIBUTE OF THE LINK ELEMENT

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 481 days.

(21) Appl. No.: 13/519,465

(22) PCT Filed: Nov. 30, 2010

(86) PCT No.: PCT/JP2010/071370
§ 371 (c)(1),
(2), (4) Date: Jun. 27, 2012

(87) PCT Pub. No.: WO2011/080983
PCT Pub. Date: Jul. 7, 2011

(65) Prior Publication Data
US 2012/0290912 A1    Nov. 15, 2012

(30) Foreign Application Priority Data

Dec. 29, 2009   (JP) .................................. 2009-299011

(51) Int. Cl.
*G06F 3/048*        (2013.01)
*G06F 17/30*        (2006.01)
*G06Q 30/02*        (2012.01)

(52) U.S. Cl.
CPC ...... *G06F 17/30905* (2013.01); *G06F 17/3089* (2013.01); *G06Q 30/02* (2013.01)
USPC .......................................... 715/207; 715/769

(58) Field of Classification Search
CPC .................. G06F 17/3089; G06F 17/30882
USPC ....................................................... 715/207
See application file for complete search history.

(56) References Cited

U.S. PATENT DOCUMENTS

| | | | |
|---|---|---|---|
| 7,234,107 B1 * | 6/2007 | Aoki et al. ..................... | 715/207 |
| 2005/0071864 A1 | 3/2005 | Denoue et al. | |

FOREIGN PATENT DOCUMENTS

| | | |
|---|---|---|
| JP | 2000-222324 A | 8/2000 |
| JP | 2005-108210 A | 4/2005 |
| JP | 2008-250578 A | 10/2008 |
| WO | 2011/052513 A1 | 5/2011 |

OTHER PUBLICATIONS

English-language translation of International Preliminary Report on Patentability for counterpart application PCT/JP2010/071370.
International Search Report for PCT/JP2010/071370 dated Mar. 8, 2011.

* cited by examiner

*Primary Examiner* — Adam M Queler
*Assistant Examiner* — Seung Jung
(74) *Attorney, Agent, or Firm* — Sughrue Mion, PLLC

(57) ABSTRACT

To direct the user's awareness towards a page linked from a specific element, a script (object control program) is embedded in a Web page to be transmitted from a Web server and then executed by a user terminal. It is assumed that a plurality of link elements (elements to which links to other Web pages are set up) are placed in the Web page. The computer terminal that executes the object control program places objects with a size covering the whole area of each link element in front of several link elements in a Web page containing a plurality of link elements and gradually scales down the displayed size of the objects. The link elements thereby gradually appear on the display.

12 Claims, 16 Drawing Sheets

WEB PAGE OBJECT PLACEMENT WITH CHANGING OBJECT SIZE RESPONSIVE TO THE ATTRIBUTE OF THE LINK ELEMENT

CROSS REFERENCE TO RELATED APPLICATIONS

This application is a National Stage of International Application No. PCT/JP2010/071370 filed Nov. 30, 2010, claiming priority based on Japanese Patent Application No. 2009-299011 filed Dec. 29, 2009, the contents of all of which are incorporated herein by reference in their entirety.

TECHNICAL FIELD

The present invention relates to a framework for displaying objects in a Web page and, particularly, to a process of controlling an object displayed in front of a specific element.

BACKGROUND ART

Related Art 1

There is a program for controlling objects displayed in a Web page (see Patent Literature 1). Specifically, in a Web page that contains a link element to which a link to another Web page is provided, a plurality of icons that interfere with clicking on the link element are displayed in front of the link element, and, when user operation on an icon is detected in the Web page, the icon is displaced or removed. Note that the description of Related Art 1 is undisclosed at the time of filing of this application.

CITATION LIST

Patent Literature

PTL 1: Japanese Patent Application No. 2009-249238

SUMMARY OF INVENTION

Technical Problem

On a Web page, elements (for example, image, text, button and the like) to which links to other Web pages are provided are often placed. By providing links, arbitrary Web pages can be directly connected to each other, which can be regarded as the essence of the Web system. On the other hand, elements to which links are provided are typically placed in the page to be always visible and clickable. Therefore, particularly when a large number of elements are placed in the page, the interest and attention of users tend to be less focused on a page linked from each element.

An object of the present invention is to provide an object control method that directs the user's awareness towards a page linked from a specific element.

Another object of the present invention is to provide an object control method that displays an object which interferes with clicking superimposed on the front of an element to which a link is provided.

Yet another object of the present invention is to provide an object control method that changes the size of the object.

Still another object of the present invention is to provide an object control method that detects access to a plurality of link elements and avoids excessive access concentration on at least one link element among the plurality of link elements.

Solution to Problem

To solve the above problem, an object control method according to the present invention causes a computer terminal that displays a Web page containing a link element with a link provided to another Web page to execute a position specifying step of specifying a position of the link element, an object placement step of placing an object with a size covering at least a part of a front of the link element in front of the specified position, and a size changing step of changing a size of the object.

It is preferred that the object blocks the link element from being clicked on.

The method preferably causes the computer terminal to repeat the size changing step a plurality of times.

The size changing step may be a step of scaling down a displayed size of the object.

The position specifying step may be a step of specifying at least a top position of the link element, the object placement step may be a step of fixedly placing a top position of the object to coincide with the specified top position, and the size changing step may be a step of scaling down a length of the object.

The Web page may contain a plurality of link elements, the position specifying step may be a step of specifying positions of the respective link elements, the object placement step may be a step of placing objects in front of the respective specified positions, and the size changing step may be a step of changing sizes of the respective objects.

The size changing step may be a step of changing a size of one or a plurality of objects selected from the objects.

The size changing step may be a step of changing a size of one or a plurality of objects selected from the objects based on a priority by reference to priority data.

The size changing step may be a step of changing a size of the object placed in front of at least one link element of the plurality of link elements based on current or past statistical data of the respective link elements.

The size changing step may be a step of replacing the object with another object with a different size.

Further, to solve the above problem, an object control program according to the present invention causes a computer terminal that displays a Web page containing a link element with a link provided to another Web page to execute a position specifying step of specifying a position of the link element, an object placement step of placing an object with a size covering at least a part of a front of the link element in front of the specified position, and a size changing step of changing a size of the object.

Further, to solve the above problem, there is provided a Web sever connectable with a user terminal which includes a Web data storage means for storing Web data at least including data of a Web page containing a link element with a link provided to another Web page and the object control program according to Claim 11 embedded in the Web page, and a Web data transmitting means for transmitting the Web data to the user terminal in response to a request from the user terminal.

Advantageous Effects of Invention

The computer terminal into which the object control program is read specifies a position of the link element in a Web page containing a link element to which a link to another Web page is provided, places an object with a size covering at least a part of the front of the link element in front of the specified position, and then changes the size of the object.

For example, by placing an object that covers the whole area of a link element in front of the link element and gradually scaling down the size of the object, the link element gradually appears on the display. On the other hand, by placing an object that covers a part of a link element in front of the link element and gradually scaling up the size of the object, the link element gradually disappears from the display.

In the present invention, the link elements are tangible representations of a shopping street or shopping mall, and the objects are tangible representations of parts (shutter, door and the like) of store or shop buildings. By changing the size of an object placed in front of a specific link element, the way a specific store or shop opens and closes can be represented on the Web page. For example, by gradually scaling down the size of an object that covers the whole area of a specific link object, the way the shutter, door or the like of a specific store or shop opens can be represented on the Web page.

As a result, it is possible to attract the user's attention to a specific link element and direct the user's awareness towards a page linked from the link element.

Because of the object that interferes with clicking, accesses to the link element are limited and thereby the effect of swaying the buying inclination of users can be expected. Further, because accesses to some link elements among a plurality of link elements are limited and thereby accesses can be distributed to the residual link elements, it is possible to reduce the load on a server that processes some link elements and equalize the load on the servers as a whole.

DESCRIPTION OF EMBODIMENTS

Definition

Element . . . Generic term for text, image, figure, button and the like that are displayed in a Web page.

Link element . . . Element to which a link to another Web page is provided.

Object . . . One that can be represented on a Web page. In the following description, image element to which a link to another Web page is not provided (transition of pages does not occur when clicked).

Embodiment

1. System Configuration

Figure 1:
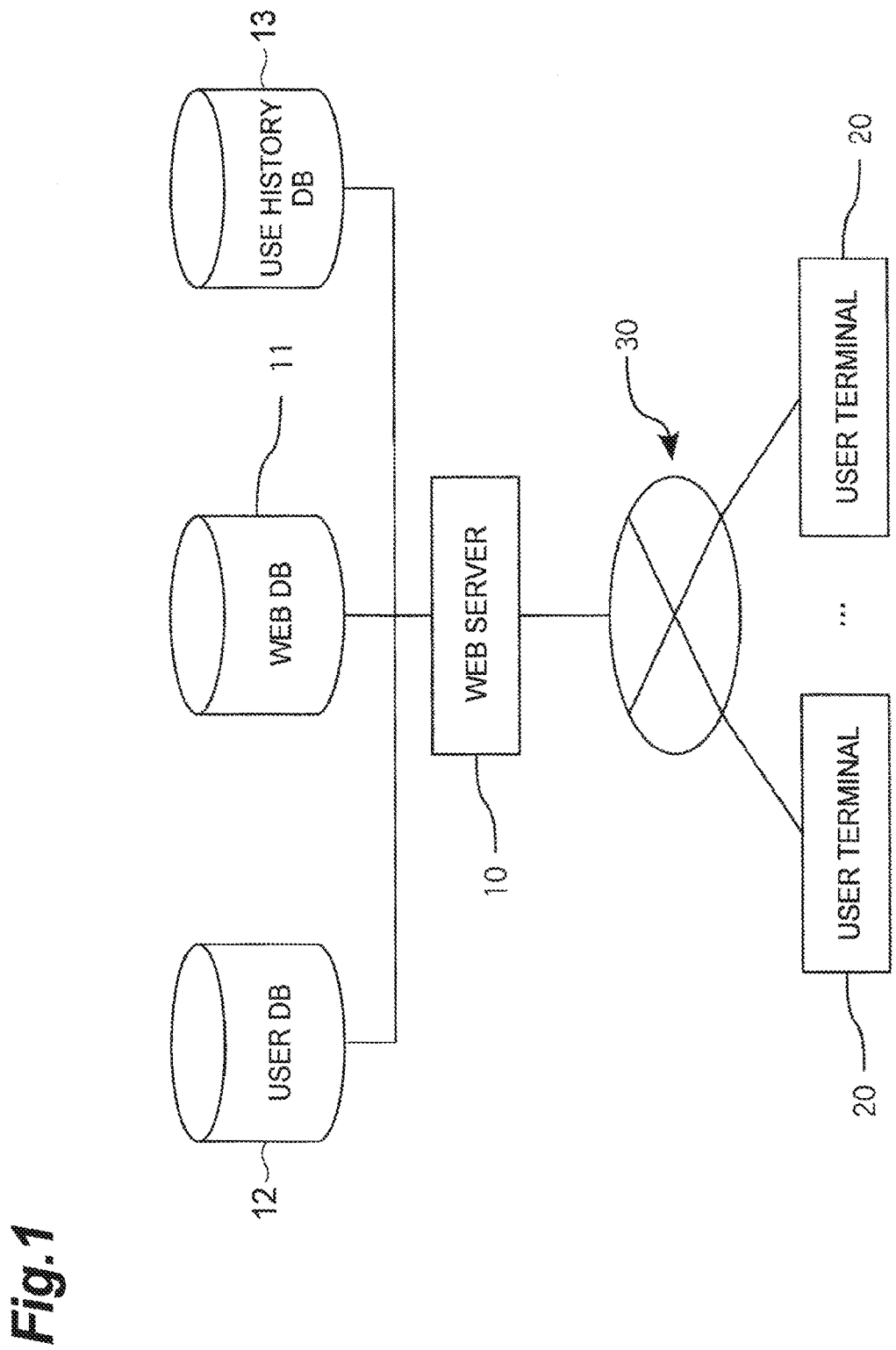
FIG. 1 is a block diagram showing a system configuration (embodiment).

FIG. 1 shows a configuration of a system according to this embodiment. As shown in FIG. 1, the system according to the embodiment is a client/server system in which a Web server 10 and a user terminal 20 are connected through a communication network (which is Internet 30 in this embodiment).

The Web server 10 includes a Web DB 11 that stores various data (HTML and image referred to by the HTML, style sheet, script and the like, which are hereinafter referred to collectively as "Web data") which constitute a Web page, and transmits designated Web data to the user terminal 20 in response to a request from the user terminal 20.

Further, the Web server 10 includes a user DB 12 that stores user registration information (address, name, age, gender and email address, which are hereinafter referred to collectively as "user attribute"). The user DB 12 provides attribute information for creating a Web page to the Web server 10.

Further, the Web server 10 includes a use history DB 13 that stores the past use history (the page views, the click-through rate, the order quantity for each date, day of week or time) of each Web page. The use history DB 13 provides history information for creating a Web page to the Web server 10.

The user terminal 20 has a Web browser, reads the Web data received from the Web server 10 and displays the data on a display. It is assumed that the Web browser is capable of interpretation and execution of a script (for example, a program written in Java (registered trademark) Script), and settings for interpretation and execution are ON. The user terminal 20 may be an information processing terminal having communication functions (for example, an electronic computer such as a personal computer).

2. Object Control Program (a) Feature

In the system of this embodiment, a script (object control program) is embedded in a web page to be transmitted from a computer readable medium in web server 10, and executed by the user terminal 20. It is assumed that a plurality of link elements (elements to which links to other web pages are set up) are placed in the web page.

The computer terminal into which the object control program is read places objects in front of several link elements in a Web page that contains a plurality of link elements and gradually changes the displayed size of the objects. For example, the computer terminal places an object that covers the whole area of a link element in front of the link element. It then gradually scales down the size of the object. Specifically, with the top side of the object fixed, the length is gradually scaled down without changing the width. A linkable link element thereby gradually appears on the display.

On the other hand, the computer terminal places an object that covers a part of a link element in front of the link element. Specifically, an object with a slight length is placed on the top side of the link element. It then gradually scales up the size of the object. Specifically, with the top side of the object fixed, the length is gradually scaled up without changing the width. A linkable link element thereby gradually disappears from the display.

It is preferred, in a Web page containing a plurality of link elements, to change the size of objects that are displayed in front of the link elements independently of one another.

The size of an object that is placed in front of a link element is changed on the basis of the current or past various access data and statistical data (for example, the page views (PV), the click-through rate (CTR), the order quantity and the like) corresponding to the link element. For example, when the current access count of one link element is larger than the current access count of the other link elements, the size of an object placed in front of the one link element is set larger than the size of objects placed in front of the other link elements. Further, for example, when the past access count of one link element is smaller than the access count at the same past time of the other link elements, the size of an object placed in front of the one link element is set smaller than the size of objects placed in front of the other link elements.

Further, link elements desired to be accessed and link elements not desired to be accessed are recognized according to the current server load. For a link element desired to be accessed, the size of an object placed in front of the link element is reduced so that clicking on the link element becomes easy. For a link element not desired to be accessed, the size of an object placed in front of the link element is increased so that clicking on the link element becomes difficult.

For selection of a link element, the current access data, the past data during a certain time period which was a certain period ago, or the current server load may be used. In any case, a threshold may be set so that the element can be selected on the basis of the threshold.

First Embodiment

An object with a size that covers the whole area of each link element is placed in front of each of several link elements, and the displayed size of the object is gradually scaled down. The link element thereby gradually appears on the display.

Second Embodiment

An object with an appropriate size is placed in front of each of several link elements, and the displayed size of the object is gradually scaled up to cover the whole area of the link element. The link element thereby gradually disappears from the display.

In a Web page, the link elements are tangible representations of a shopping street or shopping mall, and the objects are tangible representations of parts (shutter, door and the like) of store or shop buildings. By changing the displayed size of an object placed in front of a specific link element, the way a specific store or shop opens and closes can be represented on the Web page. For example, by gradually scaling down the displayed size of an object that covers the whole area of a specific link object, the way the shutter, door or the like of a specific store or shop opens can be represented on the Web page.

As a result, it is possible to attract the user's attention to the link element and direct the user's awareness towards a page linked from the specific link element. Further, by placing an object, which is an image to which a link to another Web page is not provided (transition of pages does not occur when clicked), in front of a link element in a superimposed manner, it is possible to functionally achieve the covering effect in a visual way.

(b) Execution Procedure

Figure 2:
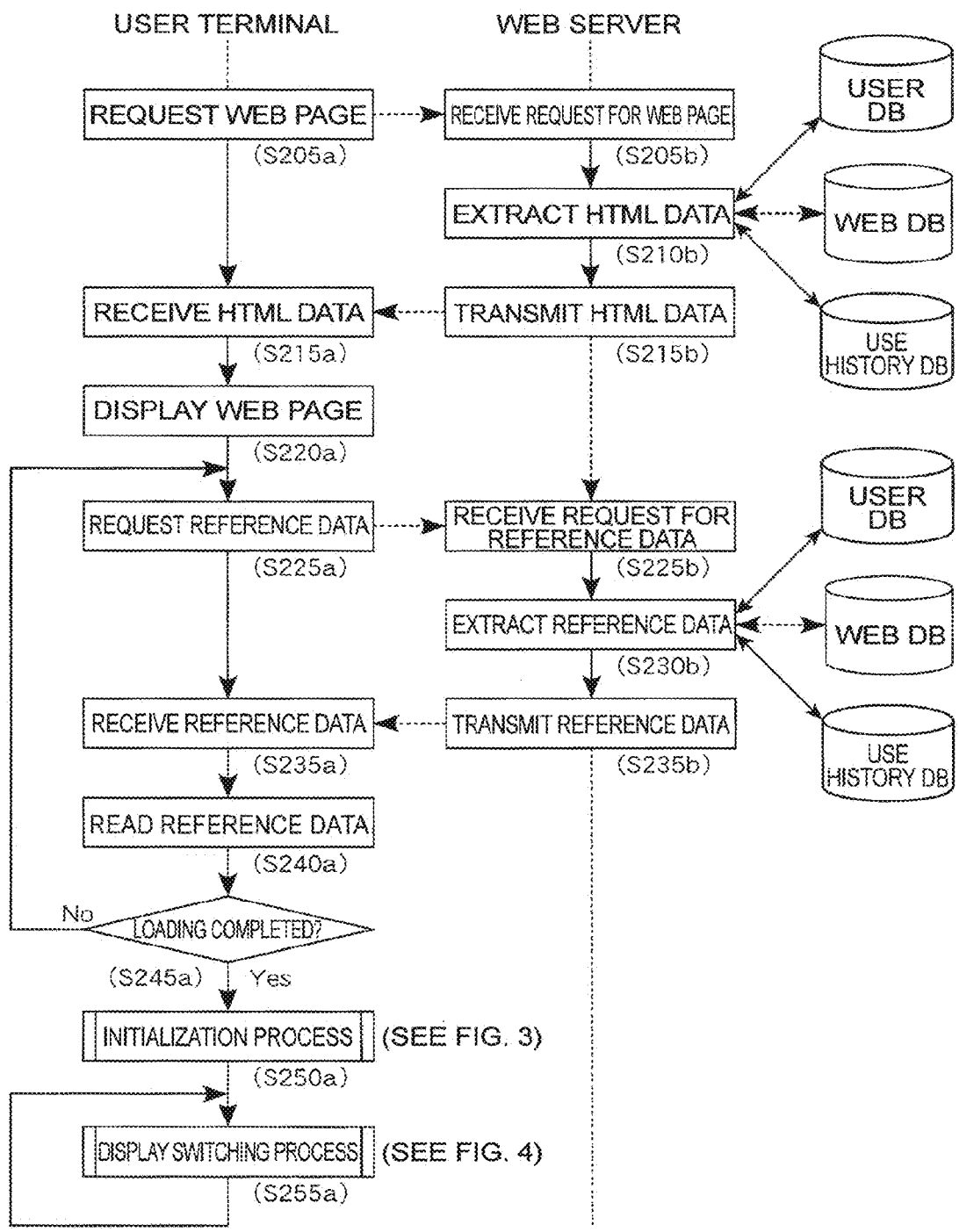
FIG. 2 is a flowchart showing an execution procedure of an object control program (embodiment).

FIG. 2 shows the execution procedure of the object control program in the system according to this embodiment.

<11> The user terminal 20 makes a request for a Web page by designating a URL to the Web server 10 (S205a). The Web server 10 receives the request for the Web page from the user terminal 20 (S205b), extracts HTML data corresponding to the designated URL from the Web DB 11 (S210b) and refers to the user DB 12 and the use history DB 13 according to need, and then transmits the data to the user terminal 20 (S215b). The user terminal 20 receives the HTML data from the Web server 10 (S215a) and displays the Web page on the display (S220a).

<12> The user terminal 20 makes a request for reference data in the HTML data by designating a URL to the Web server 10 (S225a). The Web server 10 receives the request for the reference data from the user terminal 20 (S225b), extracts reference data corresponding to the designated URL from the Web DB 11 (S230b) and refers to the user DB 12 and the use history DB 13 according to need and then transmits the data to the user terminal 20 (S235b). The user terminal 20 receives the reference data from the Web server 10 (S235a), reads the reference data (S240a), and reflects the data on the currently displayed Web page according to need.

<13> The user terminal 20 determines whether loading of the Web page (including the reference data) has completed or not (S245a). When the loading has not completed (No in S245a), returns to the above <12> and further acquires other reference data. On the other hand, when the loading has completed (Yes in S245a), proceeds to the following <14> and starts execution of the script (object control program).

<14> An initialization process (S250a, FIG. 3) and a display switching process (S255a, FIG. 4) are executed. Note that the display switching process is executed repeatedly every given time period (for example, 100 milliseconds).

3. Initialization Process (a) Procedure of Initialization Process

Figure 3:
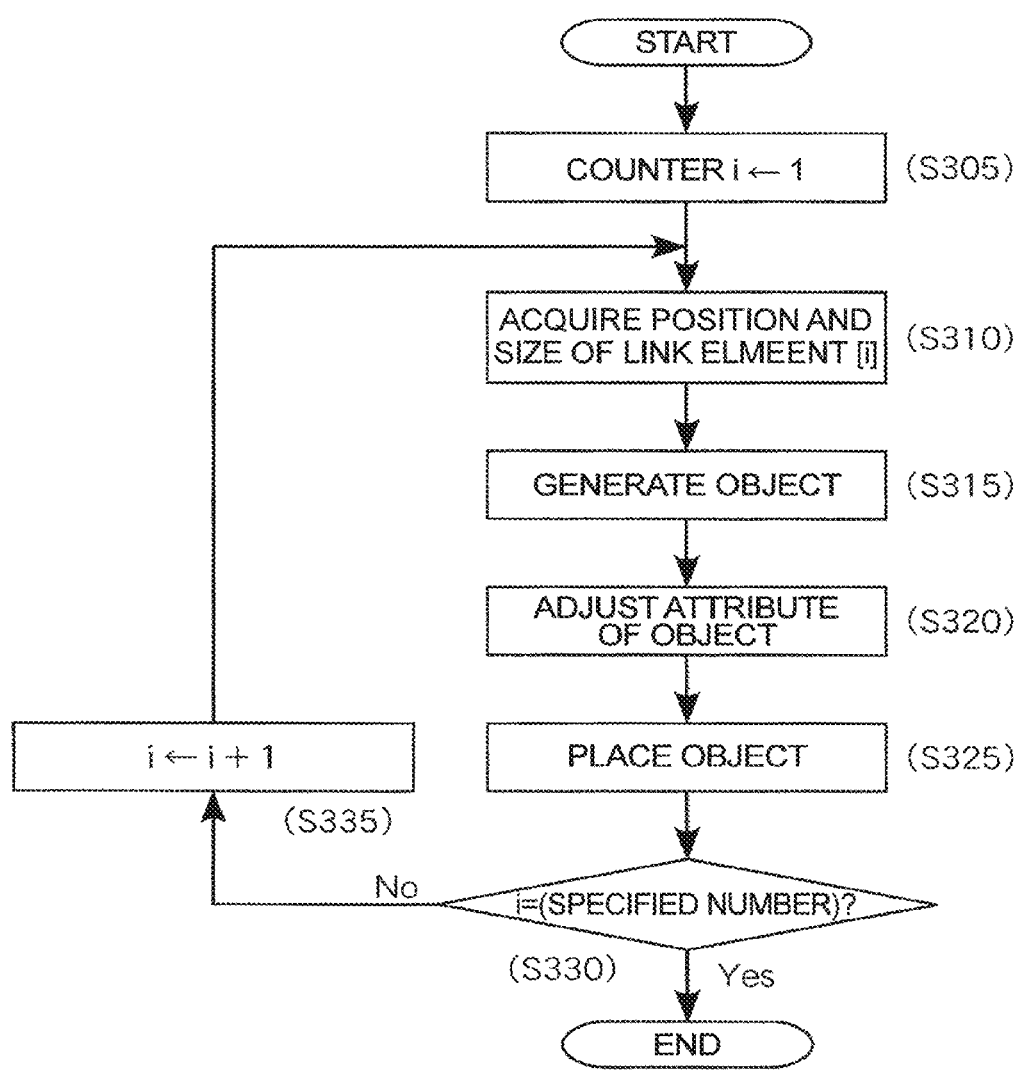
FIG. 3 is a flowchart showing a procedure of an initialization process (embodiment).

FIG. 3 shows a procedure of the initialization process. Hereinafter, a procedure to place objects (image elements) in front of a specified number (9 in this embodiment) of link objects is described by way of illustration. It is assumed that identifiers (id) containing serial numerical values are assigned in advance to specific link elements in a Web page.

As shown in FIG. 3, the user terminal 20 executes the initialization process by the following steps <21> to <25>. Note that, in the following description, the i-th link element (link element to which an identifier containing i is assigned) is referred to as a link element [i]. Further, an object placed in front of the link element [i] is referred to as an object [i].

<21> Substitute an initial value 1 into a counter i indicating the link element or object number (S305).

<22> Acquire the position and size of the link element [i] (S310).

<23> Generate the object [i] (S315) and adjust its attribute (S320).

<24> Place the object [i] at a specified position in the Web page (S325). For example, the object [i] (<img> element) generated in the above <23> is added to a child element of <body> of HTML data.

<25> Determine whether the counter i is equal to a specified number (9 in this embodiment) (S330). When the counter i is equal to the specified number (Yes in S330), end the initialization process. On the other hand, when the counter i is not equal to the specified number (No in S330), add 1 to the counter i (S305) and return to the above <22>.

(b) Adjustment of Attribute

In the above step <22>, the user terminal 20 acquires the position and size of the link element [i] (S310). Further, in the above step <23>, the user terminal 20 adjusts the attribute of the object [i] (S320).

A specific procedure in each embodiment is as follows.

First Embodiment

Specify pixel coordinates at the top left corner, the width and the length of the link element [i]. Then, set the pixel coordinates at the top left corner, the width and the length of the object [i] to the pixel coordinates at the top left corner, the width and the length of the object [i], respectively.

Second Embodiment

Specify at least the pixel coordinates at the top left corner and the width of the link element [i]. Then, set the pixel coordinates at the top left corner and the width of the object [i] to the pixel coordinates at the top left corner and the width of the object [i], respectively. Further, set the length of the object [i] to a specified value (for example, 10 pixels, 0 pixel).

Note that the above procedure assumes to fix the top position of the object and scale down/up the displayed size only in the vertical direction.

The attribute of the object [i] is preferably set appropriately according to the attribute of the link element [i], the fixed position of the object [i], and the direction of the scale down/up.

For example, the aspects of setting include the followings.
In the case of fixing the left position of the object and scaling down/up the displayed size in the horizontal direction, set the top left or bottom left corner, the length, the width and the like of the object [i], for example.
In the case of fixing the right position of the object and scaling down/up the displayed size in the horizontal direction, set the top right or bottom right corner, the length, the width and the like of the object [i], for example.

Further, it is feasible to fix positions in two directions at the top or bottom and the left or right of the object and scale down/up the displayed size in two directions of vertical and horizontal.

Figure 4:
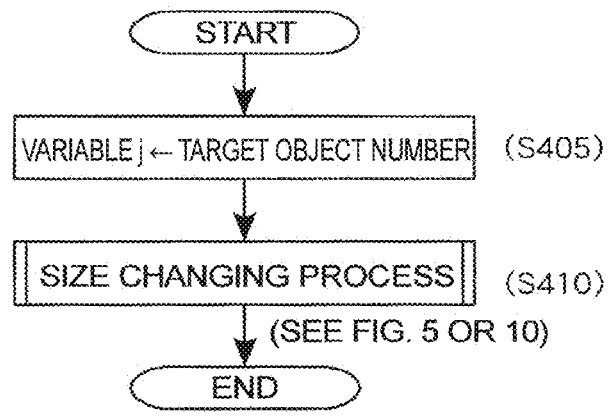
FIG. 4 is a flowchart showing a procedure of a display switching process (embodiment).

4. Display Switching Process 4-1. Outline of Display Switching Process (a) Procedure of Display Switching Process FIG. 4 shows a procedure of the display switching process. As described earlier, the display switching process is configured to be executed repeatedly every given time period (for example, 100 milliseconds) (cf. S255a in FIG. 2). In the following description, the i-th link element (link element to which an identifier containing i is assigned) is referred to as the link element [i]. Further, an object placed in front of the link element [i] is referred to as the object [i].

<31> Select an object to serve as a target of the size changing process and substitute its number into the variable j (S405).

Figure 5:
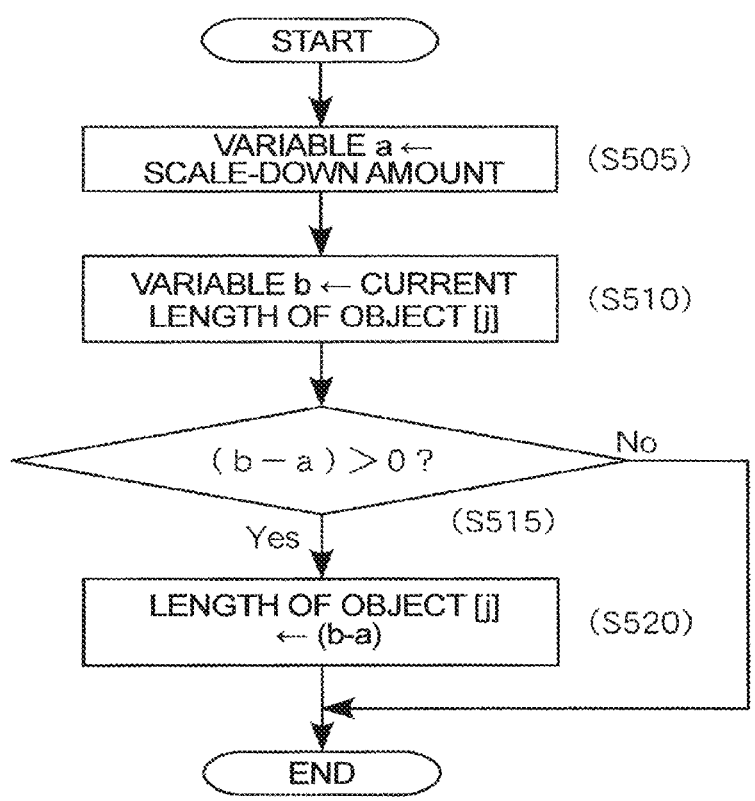
FIG. 5 is a flowchart showing a procedure of a size changing process (first embodiment).
Figure 10:
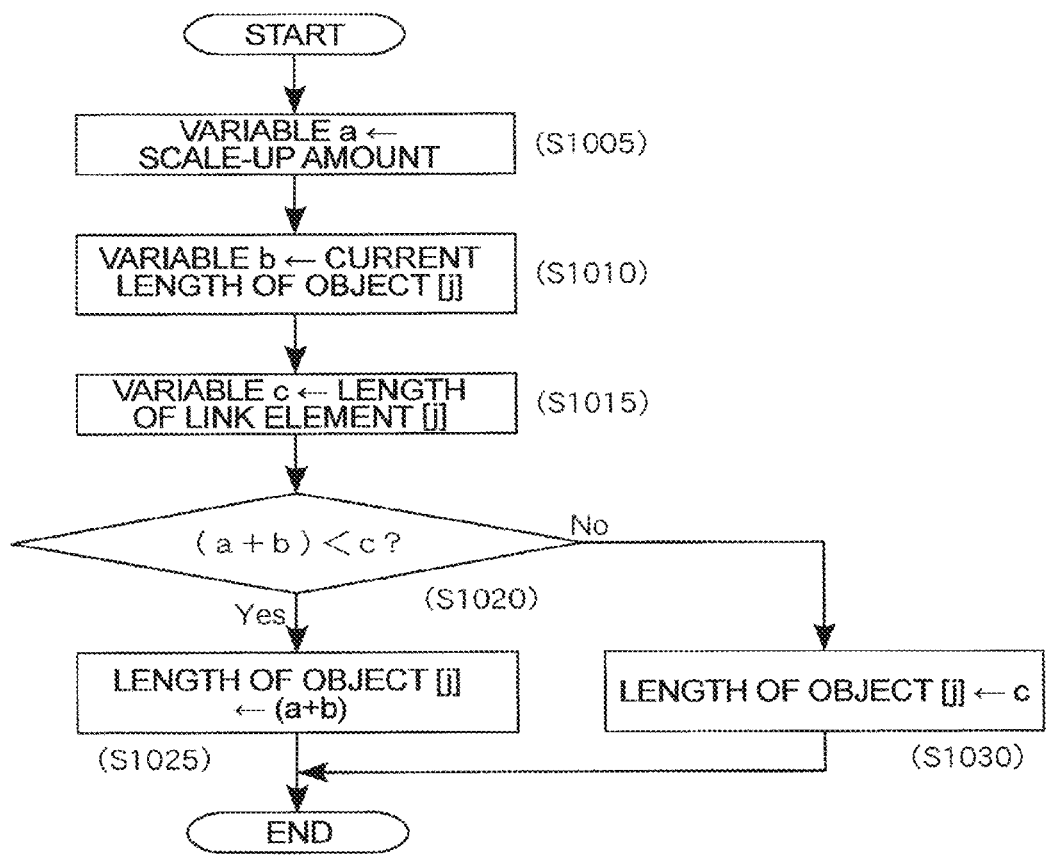
FIG. 10 is a flowchart showing a procedure of a size changing process (second embodiment).

<32> Execute the size changing process on the selected object (S410). FIG. 5 shows a procedure of the size changing process in the first embodiment. Further, FIG. 10 shows a procedure of the size changing process in the second embodiment.

(b) Selection of Target Object

In the above step <31>, the user terminal 20 selects an object to serve as a target of the size changing process and substitutes its number into the variable j (S405). It is preferred to select the target object as follows.
Select an object sequentially in the numerical order of identifiers (id).
Select an object randomly. For example, generate a random number within a specified range and select a target object according to the random number.
Select an object according to the priority. For example, receive priority data (for example, file in JSON format) indicating the priority of each link element as the reference data from the Web server 10 (S225a to S235a in FIG. 2), and select an object by the probability proportional to the priority of the corresponding link element or its inverse number. It is preferred to use a random number for the selection process.

Note that it is feasible to select a plurality of objects and use each of the selected objects as a target of the size changing process. For example, it is feasible to determine whether to select each of the objects according the priority of the corresponding link element by referring to the above-described priority data.

(c) Priority Data

In the priority data, priorities are stored as numerical values for each of link elements (identifiers (id) of link elements). It is preferred to set values of the priorities in the following point of view, for example.
Set priorities according to the user attribute (the gender, the age group). For example, if a user of the user terminal 20 has been authenticated, set a high priority to a link element which is popular (for example, the link view rate, the product order rate through a linked page and the like) among users having the same attribute as the user.
Set priorities according to the server load. For example, set a low priority to a link element where the load on a server that manages a linked page is heavy.
Set priorities arbitrarily. For example, set a high priority to a link element desired to attract many users' attention.

4-2. Size Changing Process in First Embodiment (a). Procedure of Size Changing Process FIG. 5 shows a procedure of the size changing process by the user terminal 20.

<41> Substitute the scale-down amount (number of pixels) of the displayed size into the variable a (S505).

<42> Substitute the current length (number of pixels) of the object [j] into the variable b (S510).

<43> Determine whether the expression "(b−a)>0" is true or false (S515). When the expression is true (Yes in S515), change the length of the object [j] to (b−a) (S520). On the other hand, when the expression is false (No in S515), do nothing.

(b) Display Example

FIGS. 6 to 9 show display examples of a Web page. In the first embodiment, objects with a size that covers the whole area of each link element are placed in front of several link elements, and the displayed size of the objects is gradually scaled down. FIGS. 6 to 9 are display examples showing the way the link elements gradually appear on the display.

(FIG. 6) In a Web page (600), an object (610*a*) is placed in front of a link element (610*b* of FIGS. 7 to 9) and covers the whole area of the link element. The same applies to the other objects.

(FIG. 7) The displayed size (length) of the object (610*a*) is scaled down, and a part of the link element (610*b*) appears on the display. The same applies to the other objects and link elements.

(FIG. 8) The displayed size (length) of the object (610*a*) is further scaled down, and the most part of the link element (610*b*) appears on the display. The same applies to the other objects and link elements.

(FIG. 9) The displayed size (length) of the object (610*a*) is further scaled down, and substantially the whole area of the link element (610*b*) appears on the display. The same applies to the other objects and link elements.

(c) Effect

As shown in those display examples, by placing an object (which is an image representing a shutter in the display examples of FIGS. 6 to 9) with a displayed size that covers the whole area of a link element in front of the link element and gradually scaling down the displayed size (length) of the object with its top position fixed, the way the shutter of a specific store or shop opens is represented on the Web page. It is thereby possible to attract the user's attention to the link element and direct the user's awareness towards a page linked from the specific link element.

(d) Other

In FIGS. 6 to 9, the following additional elements are also shown.

Figure 6:
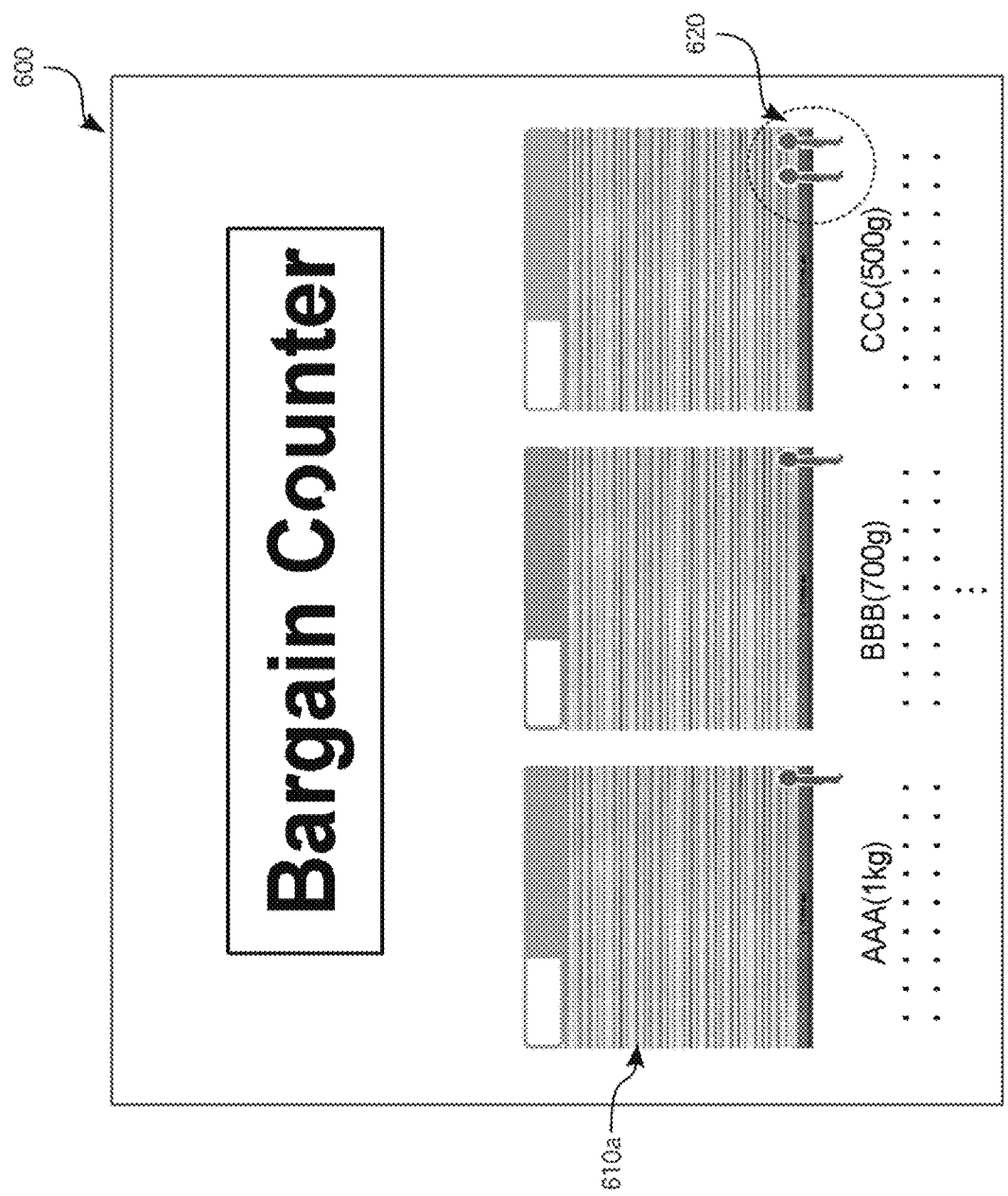
FIG. 6 is a display example of a Web page (first embodiment).

Images representing persons (person images) are placed in the vicinity of each link element (620 in FIG. 6 etc.). The situation where users line up in a queue in front of the shop is thereby brought into mind. It is preferred to remove the person images at specified timing.

Figure 7:
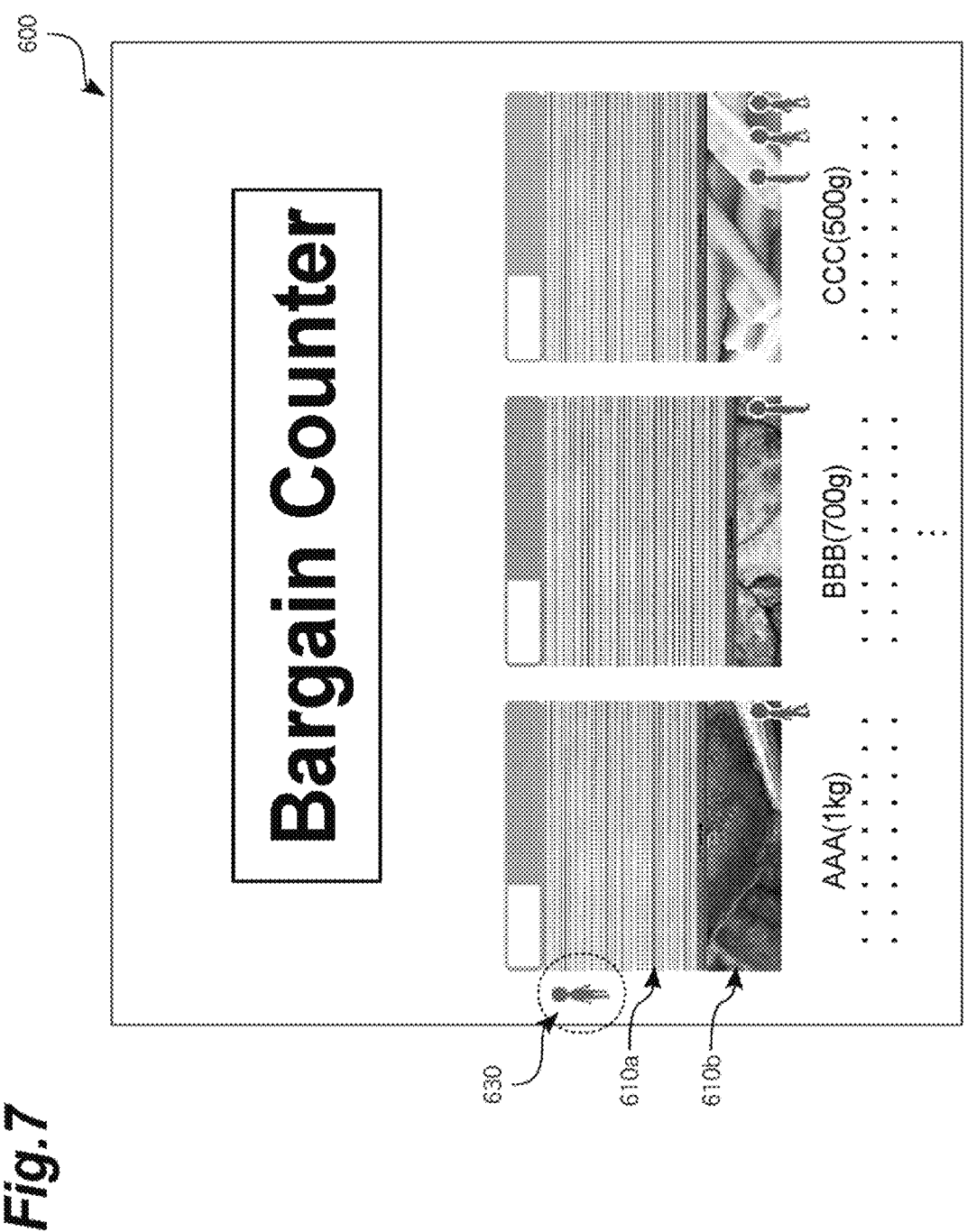
FIG. 7 is a display example of a Web page (first embodiment).
Figure 8:
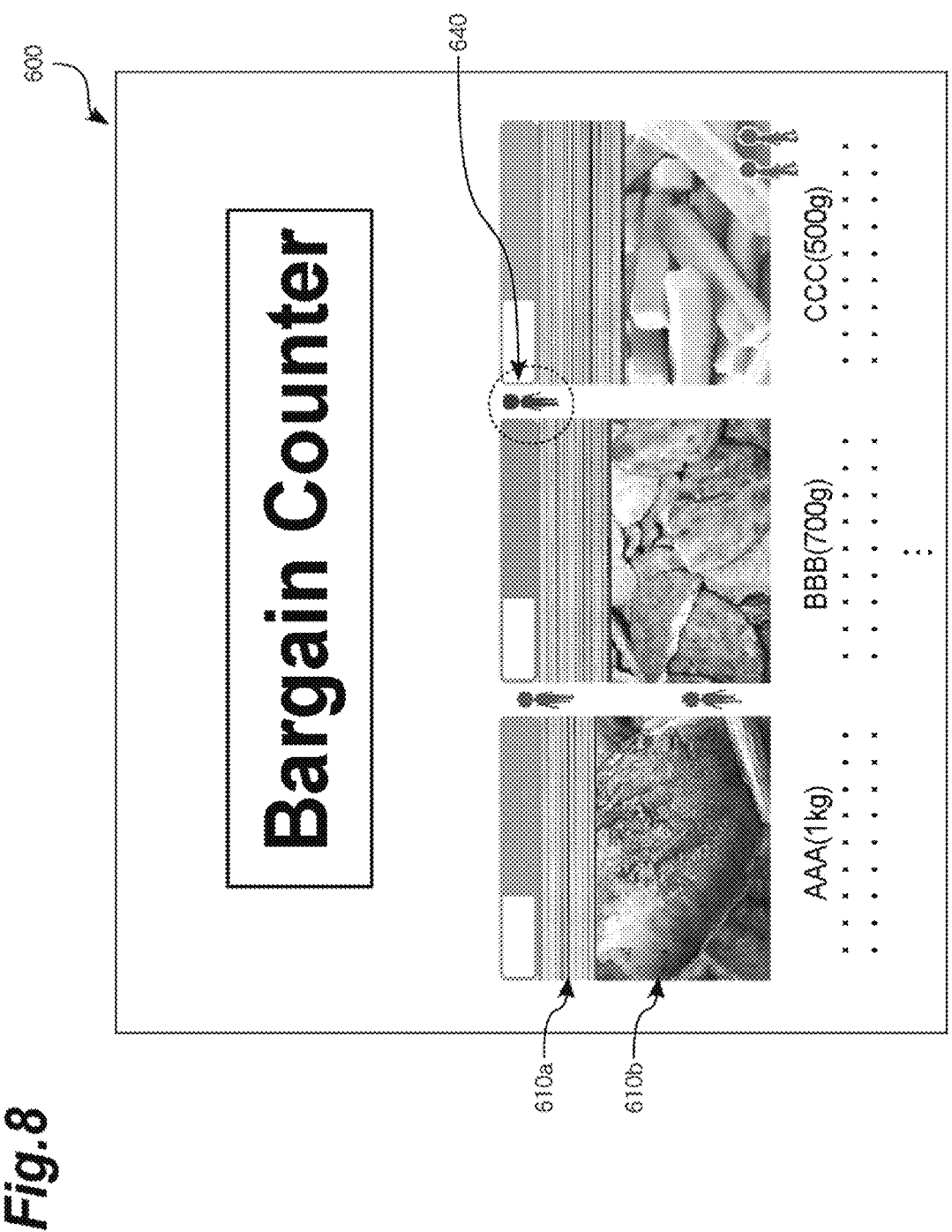
FIG. 8 is a display example of a Web page (first embodiment).
Figure 9:
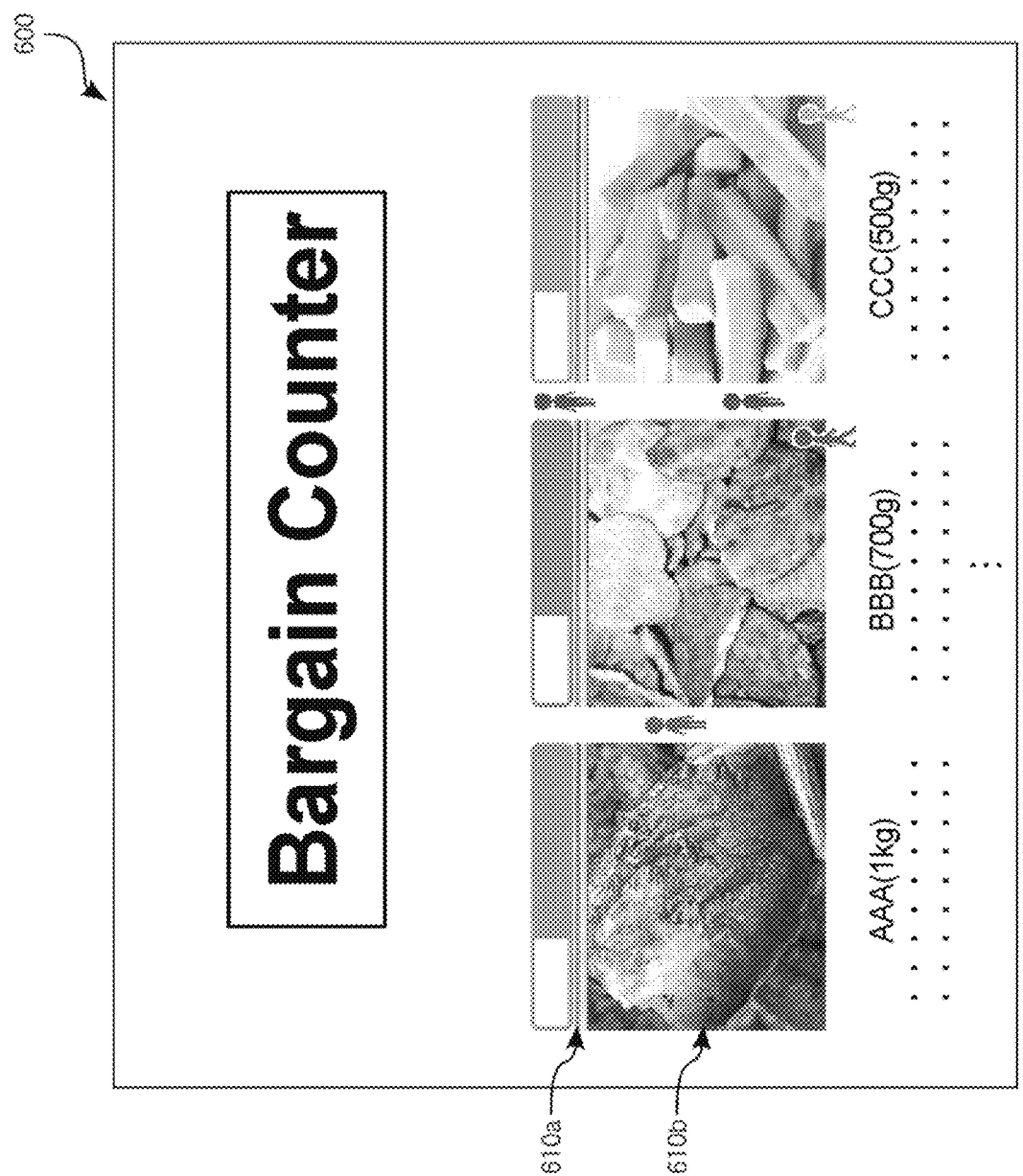
FIG. 9 is a display example of a Web page (first embodiment).

The person images are moved along a specified path (a gap in the Web page), starting at a specified position in an image representing a road, and then placed in the vicinity of any link (630 in FIG. 7, 640 in FIG. 8 etc.). The situation where a queue becomes longer is thereby brought into mind.

The person images have the color and shape reflecting the user attribute (the gender, the age group and the like). Further, the destination of each human image is decided on the basis of statistical data (the page views, the product order quantity for each user attribute and the like). The degree of popularity of a linked page for each user attribute is thereby represented visually.

4-3. Size Changing Process in Second Embodiment (a). Procedure of Size Changing Process FIG. 10 shows a procedure of the size changing process by the user terminal 20.

<51> Substitute the scale-up amount (number of pixels) of the displayed size into the variable a (S1005).

<52> Substitute the current length (number of pixels) of the object [j] into the variable b (S1010).

<53> Substitute the length (number of pixels) of the link element [j] into the variable c (S1015).

<54> Determine whether the expression "(a+b)<c" is true or false (S1020). When the expression is true (Yes in S1020), change the length of the object [j] to (a+b) (S1025). On the other hand, when the expression is false (No in S1020), change the length of the object [j] to c (S1030). At this time, the reference image of the object [j] is preferably changed to a specified image.

(b) Display Example

FIGS. 11 to 14 show display examples of a Web page. In the second embodiment, objects with an appropriate displayed size (a specified displayed size that does not cover the whole area of a link element) are placed in front of several link elements, and the displayed size of the objects is gradually scaled up to cover the whole area of the link elements. FIGS. 11 to 14 are display examples showing the way the link elements gradually disappear from the display.

(FIG. 11) In a Web page (1100), an object (1110*a*) with a specific displayed size is placed in front of a link element (1110*b*). The same applies to the other objects and link elements.

(FIG. 12) The displayed size (length) of the object (1110*a*) is scaled up, and a part of the link element (1110*b*) disappears from the display. The same applies to the other objects and link elements.

(FIG. 13) The displayed size (length) of the object (1110*a*) is further scaled up, and the most part of the link element (1110*b*) disappears from the display. The same applies to the other objects and link elements.

(FIG. 14) The displayed size (length) of the object (1110*a*) is further scaled up, and the link element (1110*b*) is completely covered on the display. The same applies to the other objects and link elements.

(c) Effect

As shown in those display examples, by placing an object (which is an image representing a shutter in the display examples of FIGS. 11 to 14) with an appropriate displayed size in front of the link element and gradually scaling up the displayed size (length) of the object with its top position fixed, the way the shutter of a specific store or shop closes is represented on the Web page. It is thereby possible to attract the user's attention to the link element and direct the user's awareness towards a page linked from the specific link element. Further, the effect of promoting clicking on the link element can be expected.

(d) Other

Figure 11:
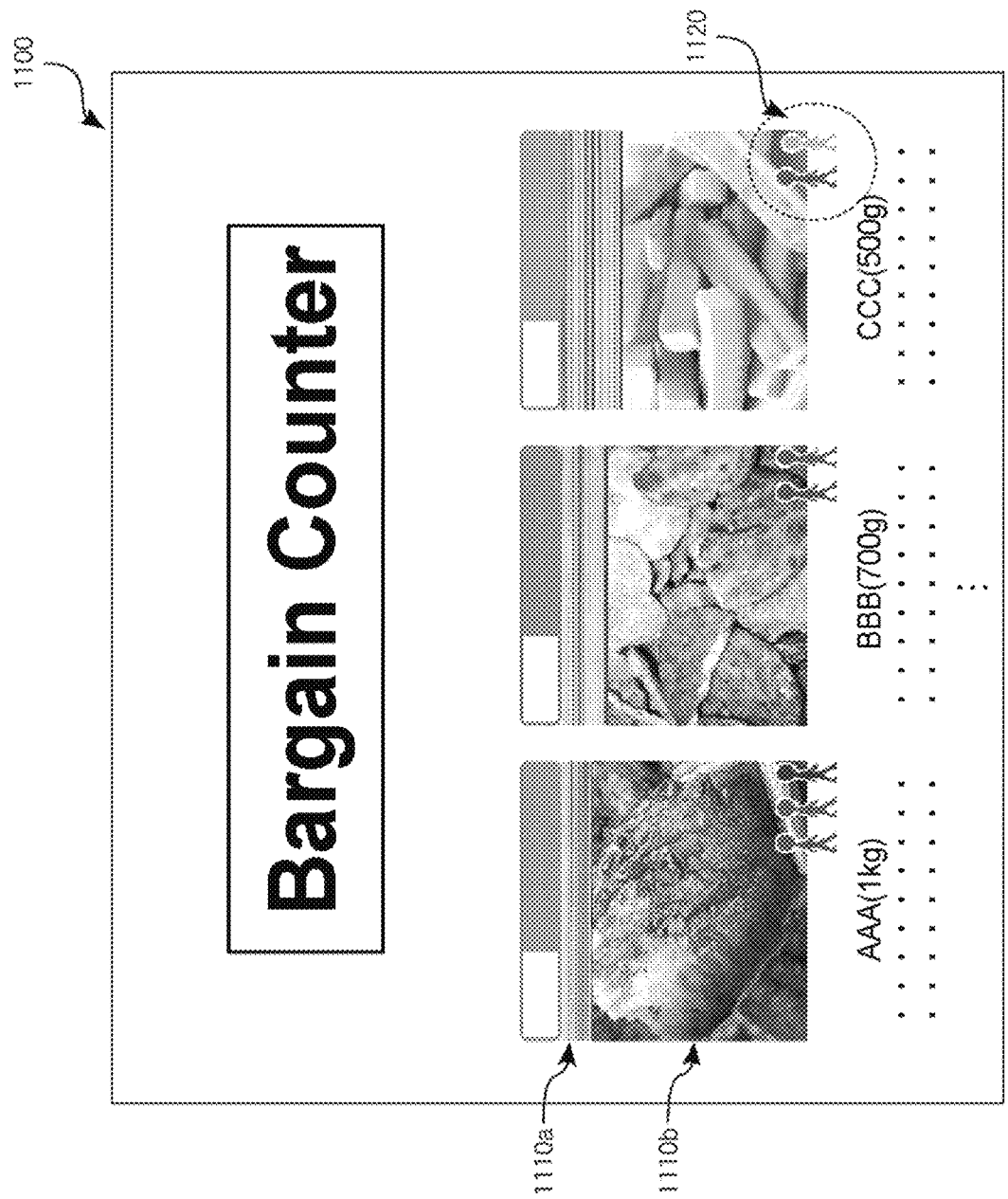
FIG. 11 is a display example of a Web page (second embodiment).
Figure 12:
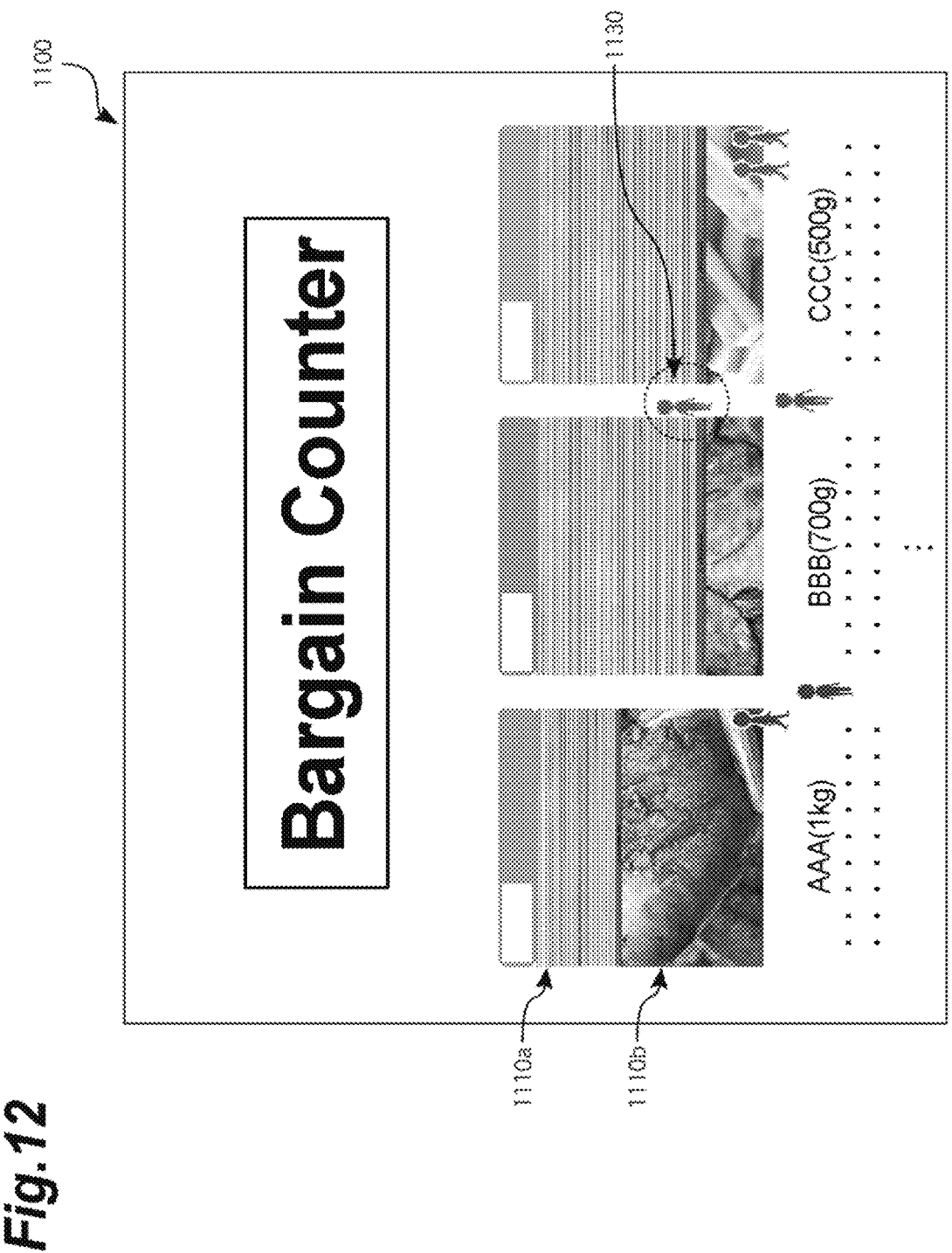
FIG. 12 is a display example of a Web page (second embodiment).
Figure 13:
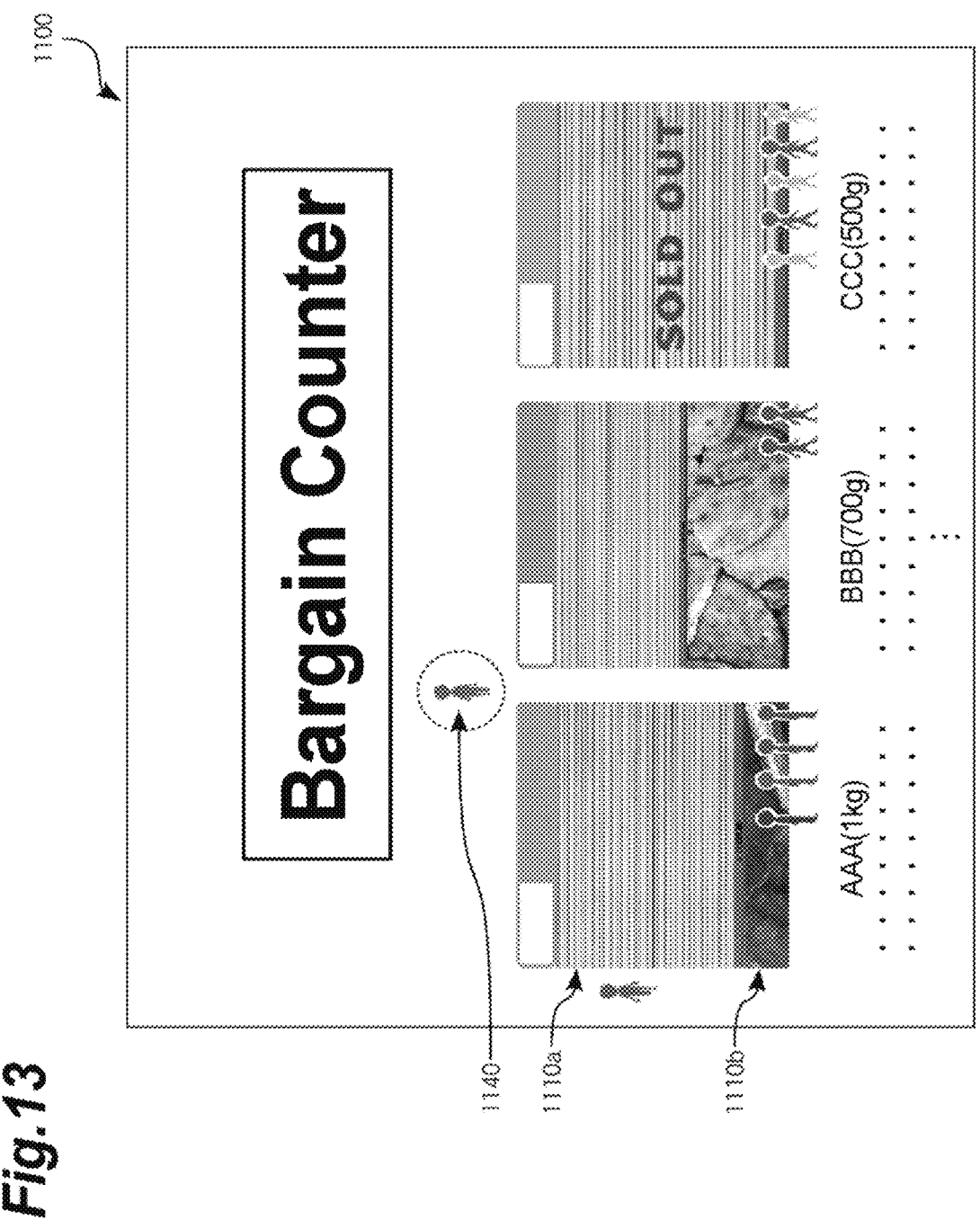
FIG. 13 is a display example of a Web page (second embodiment).
Figure 14:
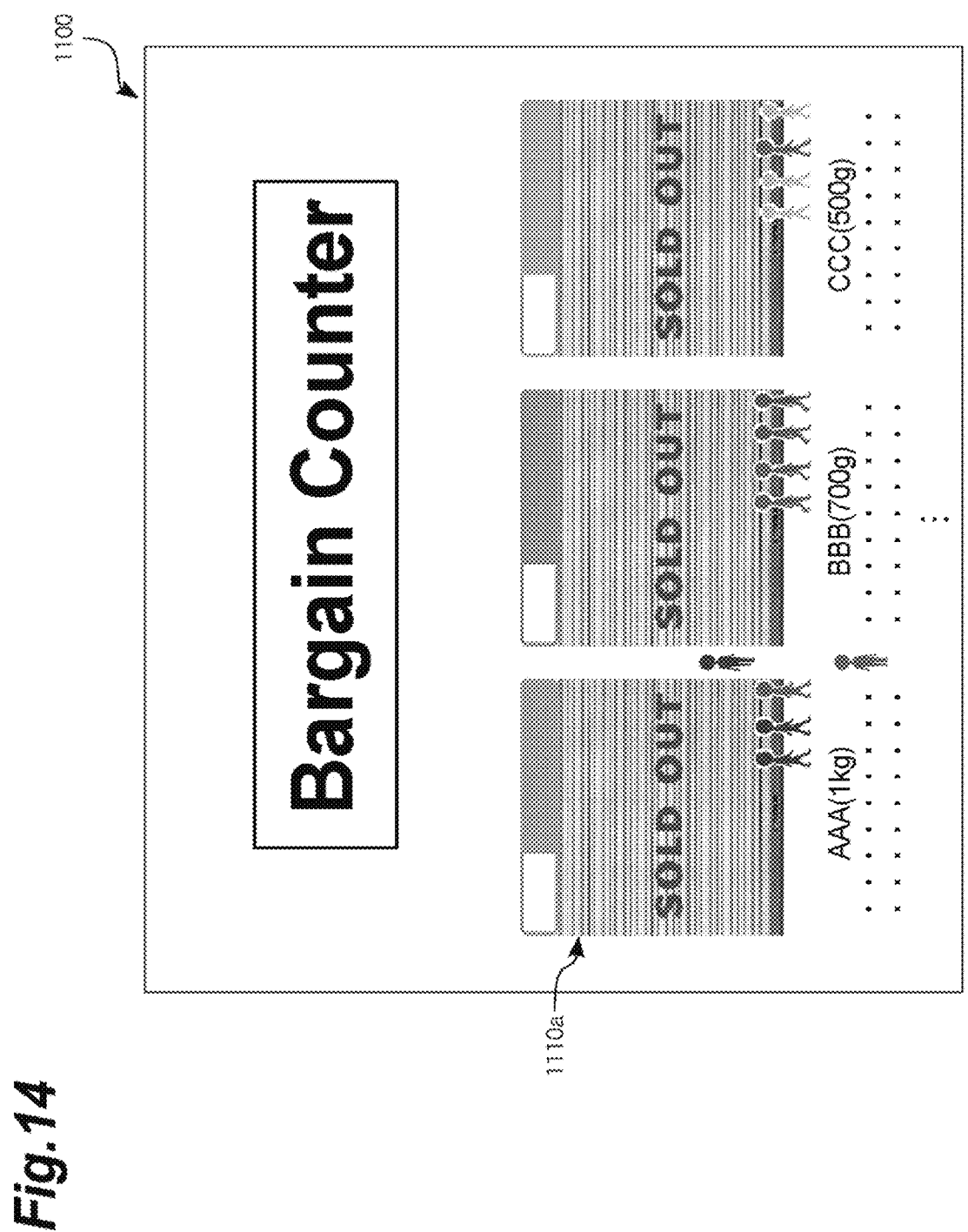
FIG. 14 is a display example of a Web page (second embodiment).

In FIGS. 11 to 14, the following additional elements are also shown.
- Images representing persons (person images) are placed in the vicinity of each link element (1120 in FIG. 11 etc.). The situation where users line up in a queue in front of the shop is thereby brought into mind. It is preferred to remove the person images at specified timing.
- The person images are moved along a specified path (a gap in the Web page), starting at a specified position in an image representing a road, and then placed in the vicinity of any link (1130 in FIG. 12, 1140 in FIG. 13 etc.). The situation where a queue becomes longer is thereby brought into mind.
- The person images have the color and shape reflecting the user attribute (the gender, the age group and the like). Further, the destination of each human image is decided on the basis of statistical data (the page views, the product order quantity for each user attribute and the like). The degree of popularity of a linked page for each user attribute is thereby represented visually.

5. Alternative Example Etc 5-1. Change Object to Another Object of One Size Smaller Alternative Example 1

In the first embodiment, the technique of scaling down the displayed size is employed in the object size scale-down process (S520 in FIG. 5). On the other hand, a technique of changing a reference image of an object to another image (the same type of image, the similar image and the like) of one size smaller may be employed in the object size scale-down process. Although the representation on the display and the obtained effect are the same as those of the first embodiment, the technique of changing the display size is more suitable in terms of the data volume.

Figure 15:
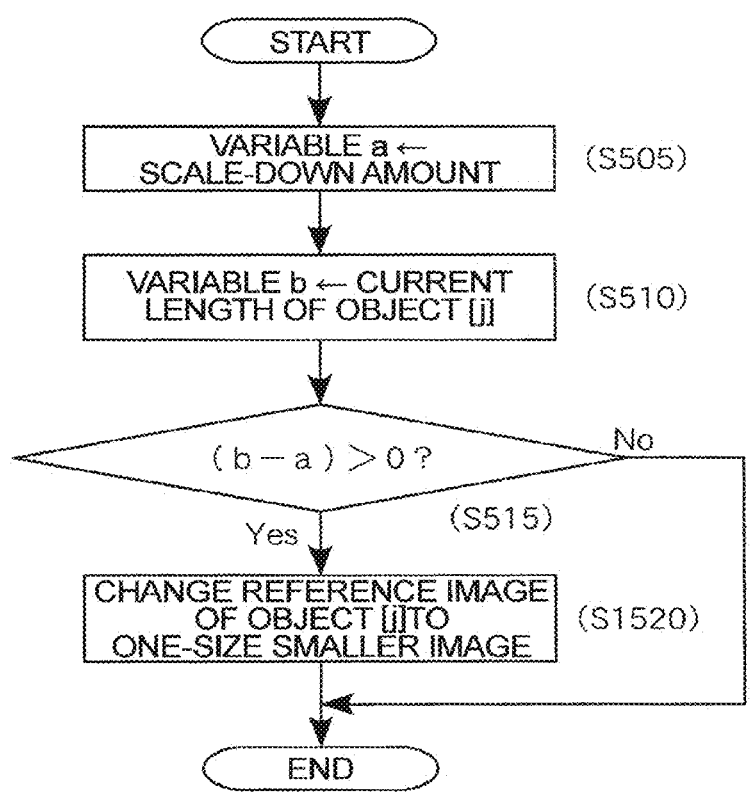
FIG. 15 is a flowchart showing a procedure of a size changing process (alternative example 1).

FIG. 15 shows a procedure of the size changing process by the user terminal 20. Note that, in FIG. 15, the process steps denoted by the same reference symbols as in FIG. 5 are the same processing.

<61> Substitute the scale-down amount (number of pixels) of the displayed size into the variable a (S505).

<62> Substitute the current length (number of pixels) of the object [j] into the variable b (S510).

<63> Determine whether the expression "(b−a)>0" is true or false (S515). When the expression is true (Yes in S515), change the reference image of the object [j] to an image of one size smaller (S1520). On the other hand, when the expression is false (No in S515), do nothing.

5-2. Change Object to Another Object of One Size Larger

Alternative Example 2

In the second embodiment, the technique of scaling up the displayed size is employed in the object size scale-up process (S1025 in FIG. 10). On the other hand, a technique of changing a reference image of an object to another image (the same type of image, the similar image and the like) of one size larger may be employed in the object size scale-up process. Although the representation on the display and the obtained effect are the same as those of the second embodiment, the technique of changing the display size is more suitable in terms of the data volume.

Figure 16:
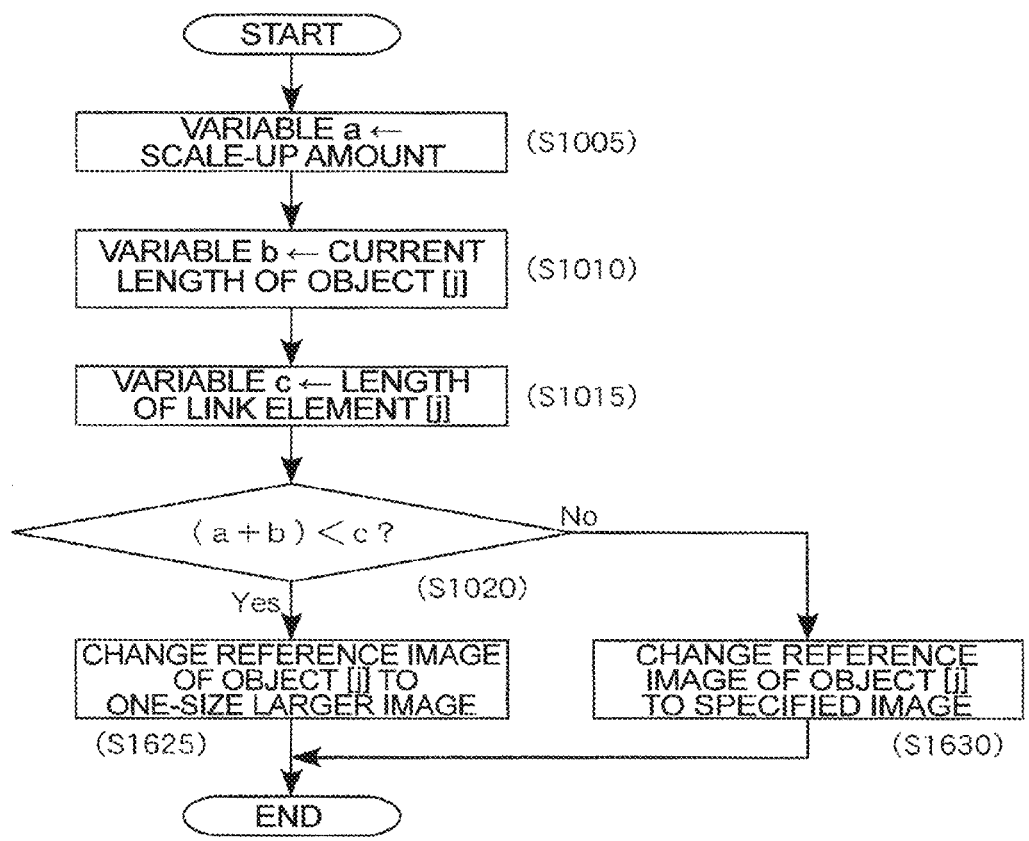
FIG. 16 is a flowchart showing a procedure of a size changing process (alternative example 2).

FIG. 16 shows a procedure of the size changing process by the user terminal 20. Note that, in FIG. 16, the process steps denoted by the same reference symbols as in FIG. 10 are the same processing.

<71> Substitute the scale-up amount (number of pixels) of the displayed size into the variable a (S1005).

<72> Substitute the current length (number of pixels) of the object [j] into the variable b (S1010).

<73> Substitute the length (number of pixels) of the link element [j] into the variable c (S1015).

<74> Determine whether the expression "(a+b)<c" is true or false (S1020). When the expression is true (Yes in S1020), change the reference image of the object [j] to an image of one size larger (S1625). On the other hand, when the expression is false (No in S1020), change the reference image of the object [j] to a specified image with a size that covers the link element [j] (S1630).

5-3. Place Plural Objects in Front of Single Link Element

Alternative Example 3

In the first and second embodiments, a single object is placed in front of a single link element (S310 to S325 in FIG. 3). A target of the size changing process is the single object. On the other hand, a plurality of objects may be placed in front of a single link element.

For example, by adjusting the attribute of each object as follows and executing the size changing process, the way two objects (images) divided into two halves by a center line are scaled down in the vertical direction can be represented on the Web page.
- Specify the pixel coordinates at the top left corner and the top right corner, the width and the length of the link element [i].
- Set the pixel coordinates at the top left corner, the width and the length of the object [i][1] to the pixel coordinates at the top left corner, ½ of the width and ½ of the length of the object [i], respectively.
- Set the pixel coordinates at the top right corner, the width and the length of the object [i][2] to the pixel coordinates at the top right corner, ½ of the width and ½ of the length of the object [i], respectively.
- Scale down the lengths of the object [i][1] and the object [i][2].

For example, by adjusting the attribute of each object as follows and executing the size changing process, the way two objects (images) are scaled down in the horizontal direction with a center line as the axis of symmetry can be represented on the Web page.
- Specify the pixel coordinates at the top left corner and the top right corner, the width and the length of the link element [i].
- Set the pixel coordinates at the top left corner, the width and the length of the object [i][1] to the pixel coordinates at the top left corner, ½ of the width and ½ of the length of the object [i], respectively.
- Set the pixel coordinates at the top right corner, the width and the length of the object [i][2] to the pixel coordinates at the top right corner, ½ of the width and ½ of the length of the object [i], respectively.

Scale down the widths of the object [i][1] and the object [i][2].

5-4. Others

The conception of stock may be applied to the scale-down amount or the scale-up amount. When a page linked from a link element is a Web page of an EC site such as a product selling page or a service providing page, the scale-down action or the scale-up action may be performed in conjunction with the stock of products sold or services provided through the page. For example, by setting "link element size=received quantity" and "object size=sales quantity=received quantity−stock quantity", the stock can be dynamically represented on the site.

REFERENCE SIGNS LIST

10 . . . Web server, 11 . . . Web DB, 20 . . . User terminal, 30 . . . Internet, 600 . . . Web page, 1100 . . . Web page

The invention claimed is:

1. An object control method causing a computer terminal that displays a web page containing a link element with a link provided to another web page to execute:
 a position specifying step of specifying a position of the link element;
 an object placement step of placing an object with a size covering at least a part of a front of the link element in front of the specified position, wherein the size of the object is relative to an attribute of the link element; and
 a size changing step of changing a size of the object responsive to a change in the attribute of the link element.

2. The object control method according to claim 1, wherein the object blocks the link element from being clicked on.

3. The object control method according to claim 1, wherein the method causes the computer terminal to repeat the size changing step a plurality of times.

4. The object control method according to claim 3, wherein the size changing step is a step of scaling up or down a displayed size of the object.

5. The object control method according to claim 4, wherein the position specifying step is a step of specifying at least a top position of the link element,
 the object placement step is a step of fixedly placing a top position of the object to coincide with the specified top position, and
 the size changing step is a step of scaling down a length of the object.

6. The object control method according to claim 1, wherein the web page contains a plurality of link elements,
 the position specifying step is a step of specifying positions of the respective link elements,
 the object placement step is a step of placing objects in front of the respective specified positions, and
 the size changing step is a step of changing sizes of the respective objects.

7. The object control method according to claim 6, wherein the size changing step is a step of changing a size of one or a plurality of objects selected from the objects.

8. The object control method according to claim 7, wherein the size changing step is a step of changing a size of one or a plurality of objects selected from the objects based on a priority by reference to priority data.

9. The object control method according to claim 7, wherein the size changing step is a step of changing a size of the object placed in front of at least one link element of the plurality of link elements based on current or past statistical data of the respective link elements.

10. The object control method according to claim 1, wherein
 the size changing step is a step of replacing the object with another object with a different size.

11. A non-transitory computer readable medium having an object control program stored thereon, said program causing a computer terminal that displays a web page containing a link element with a link provided to another web page, to execute:
 a position specifying step of specifying a position of the link element;
 an object placement step of placing an object with a size covering at least a part of a front of the link element in front of the specified position wherein the size of the object is relative to an attribute of the link element; and
 a size changing step of changing a size of the object responsive to a change in the attribute of the link element.

12. A Web server connectable with a user terminal, comprising:
 a non-transitory computer readable medium storing an object control program;
 a web data storage section configured to store web data at least including data of a web page containing a link element with a link provided to another web page, and said web server operable to embed said object control program into the Web page, so that said object control program can be accessed by said user terminal; and
 a web data transmitting section configured to transmit the web data to the user terminal in response to a request from the user terminal;
 wherein said object control program causes said user terminal to execute:
 a position specifying step of specifying a position of the link element;
 an object placement step of placing an object with a size covering at least a part of a front of the link element in front of the specified position, wherein the size of the object is relative to an attribute of the link element; and
 a size changing step of changing a size of the object responsive to a change in the attribute of the link element.

* * * * *